United States Patent [19]
Morin

[11] Patent Number: 5,209,267
[45] Date of Patent: May 11, 1993

[54] CONVOLUTED HOSE END ASSEMBLY

[75] Inventor: Thomas J. Morin, West Springfield, Mass.

[73] Assignee: Dana Corporation, Toledo, Ohio

[21] Appl. No.: 410,005

[22] Filed: Sep. 19, 1989

Related U.S. Application Data

[63] Continuation of Ser. No. 200,398, May 31, 1988, abandoned.

[51] Int. Cl.[5] .............................................. F16L 9/00
[52] U.S. Cl. .................................... 138/109; 285/242; 285/256; 285/382
[58] Field of Search ............. 285/238, 239, 242, 251, 285/256, 252, 382; 138/109, 122, 103

[56] References Cited

U.S. PATENT DOCUMENTS

| | | | |
|---|---|---|---|
| 1,786,489 | 12/1930 | Hopkins | 285/256 |
| 1,825,005 | 9/1931 | Loughead | 285/256 |
| 1,915,041 | 6/1933 | Wallace | 285/84 |
| 2,172,532 | 9/1939 | Fentress | 29/157 |
| 2,216,468 | 10/1940 | Farrar | 29/157 |
| 2,216,686 | 10/1940 | Fentress | 29/33.2 |
| 2,309,719 | 2/1943 | Vaill | 285/72 |
| 2,363,586 | 11/1944 | Guarnaschelli | 285/72 |
| 2,490,686 | 12/1949 | Guarnaschelli | 285/72 |
| 2,556,544 | 6/1951 | Johnson | 285/72 |
| 2,848,254 | 8/1958 | Millar | 285/149 |
| 2,858,147 | 10/1958 | Guarnaschelli | 285/149 |
| 3,078,109 | 2/1963 | Jackson | 285/251 |
| 3,165,338 | 1/1965 | Moss | 285/256 |
| 3,252,720 | 5/1966 | Waite | 285/256 |
| 3,381,981 | 5/1968 | Wilson | 285/149 |
| 4,063,757 | 12/1977 | Fuhrmann | 285/149 |
| 4,162,801 | 7/1979 | Kresky | 285/45 |
| 4,369,992 | 1/1983 | Fournier | 285/256 |
| 4,392,678 | 7/1983 | Adamczyk | 285/256 |
| 4,400,022 | 8/1983 | Wright | 285/256 |
| 4,653,779 | 3/1987 | Foster | 285/256 |

FOREIGN PATENT DOCUMENTS 702913 1/1941 Fed. Rep. of Germany ........ 285/84

Primary Examiner—Henry J. Recla
Assistant Examiner—Glenn T. Barrett
Attorney, Agent, or Firm—Frank B. McDonald

[57] ABSTRACT

An insert fitting for a convoluted hose end includes a generally cylindrical nipple insert having two spaced annular sealing surfaces and a relief region situated between the surfaces. The relief region has a diameter less than that of each of the sealing surfaces, each of the sealing surfaces being radially equidistant at all points from a longitudinal axis extending through the center of the insert. In the preferred form, each of the spaced sealing surfaces has a longitudinal width in the range of seventy-five to one hundred percent of the pitch width of the convoluted hose.

7 Claims, 1 Drawing Sheet

CONVOLUTED HOSE END ASSEMBLY

This application is a continuation of U.S. patent application No. 07/200,398 filed, May 31, 1988, now abandoned.

BACKGROUND OF THE INVENTION

This invention relates to insert fittings for convoluted tubing and/or hose. More particularly, the invention relates to fluid sealing efficiencies of hose-to-fitting coupling mechanisms.

The majority of prior art fitting inserts for convoluted hose and tubing have either entirely smooth, fully cylindrical surfaces or have barbed projections emanating from smooth cylindrical surfaces. In some instances, grooved inserts are utilized which have annular ridges believed to enhance the crimping process, and hence efficiency, of the fluid seal between the tubing and nipple insert portions of the fitting. Generally, regardless of which type of nipple insert is utilized, the convoluted tubing end is compressed against the insert during the crimping process, and the individual convolutions tend to collapse in random folding patterns, making relatively difficult the task of establishing a reliable fluid seal. In fact, in most applications, potential leaks and variations associated with randomly compressed convoluted tubing become even more difficult to predict and control when the fittings are barbed or have annular grooves over their cylindrical surfaces.

Ideally, a fitting insert would be designed such that the collapse of convoluted tubing during the crimping step could be controlled in a manner to assure and even to enhance fluid sealability.

SUMMARY OF THE INVENTION

The insert fitting of the present invention provides a superior fluid seal for convoluted hose. In accordance with the invention, the insert fitting has a dimensional relationship with the convoluted hose with which it is designed to mate. The fitting, particularly suitable for use with hose made of polytetrafluoroethylene material, has a shape which directs and controls the collapse of the tubing convolutions during crimping to a nipple insert. In a preferred form, the fitting includes a generally cylindrical nipple insert which contains a pair of annular sealing surfaces and a relief region positioned between the surfaces. The nipple insert has a longitudinal axis, and the surfaces are spaced along the axis. The relief region intermediate the surfaces comprises a diameter less than that of each of the sealing surfaces. Each of the sealing surfaces is generally radially equal distant at all points from the longitudinal axis of the insert. Each of the spaced sealing surfaces has a longitudinal width in the range of 75-100% of the pitch width of the convoluted hose.

DETAILED DESCRIPTION OF THE PREFERRED EMBODIMENT

Figure 1:
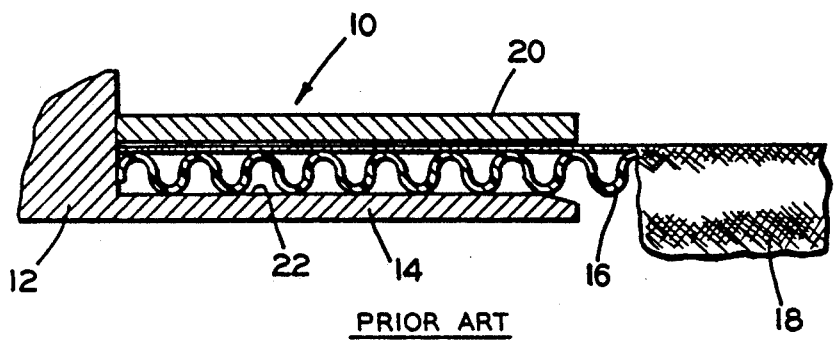
FIG. 1 is a fragmentary cross-sectional view of a convoluted hose end with a prior art nipple insert adapted for sealingly engaging the hose, prior to crimping the hose about the nipple insert.
Figure 2:
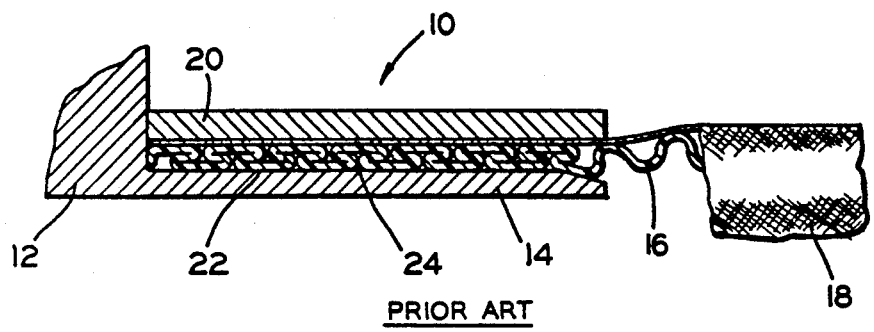
FIG. 2 is a fragmentary view similar to that of FIG. 1 with the exception that the hose has been crimped to the insert.

Referring initially to FIGS. 1 and 2, a prior art convoluted hose end assembly 10 is shown in a fragmentary cross-sectional view. The assembly 10 includes a hose end fitting 12 which includes a nipple insert 14. The insert 14 extends into a convoluted hose end 16, here shown as a hose or tubing formed of polytetrafluoroethylene material. A wire braid sheath 18 provides a cover over the polytetrafluoroethylene tubing for purposes of providing strength to the hose assembly. The sheath-tubing combination enhances the burst pressure rating for the fluid conveying structure. A crimp collar 20 surrounds the nipple insert portion 14 of the end fitting 12, overlying the convoluted hose end 16 as well as the wire braid sheath 18. The collar 20 is compressed radially inwardly over the nipple insert 14 for providing securement of the end fitting 12 to the hose end 16. FIG. 1 is a view at a time prior to the compression of the crimp collar, while FIG. 2 is a post-compression view.

Referring now more particularly to FIG. 2, it will be appreciated by those skilled in the art that the cylindrical exterior of the insert 14 is of a smooth contour, having no grooves or barbs. With such a configuration, the crimping result will typically comprise a random collapsing of the convoluted tubing or hose member 16. However, FIG. 2 depicts the most ideal compression of the hose end 16 after the crimping process, in which the collapse has occurred as uniformly as possible. Nonetheless, it will be appreciated by those skilled in the art that there remains significant potential for leakage as depicted by the helical leak path 24. This demonstrates that even under the best of conditions of hose end collapse about the nipple insert 14, a crimping process which provides for no flattening of convolutions appears to inherently invite leakage.

Figure 3:
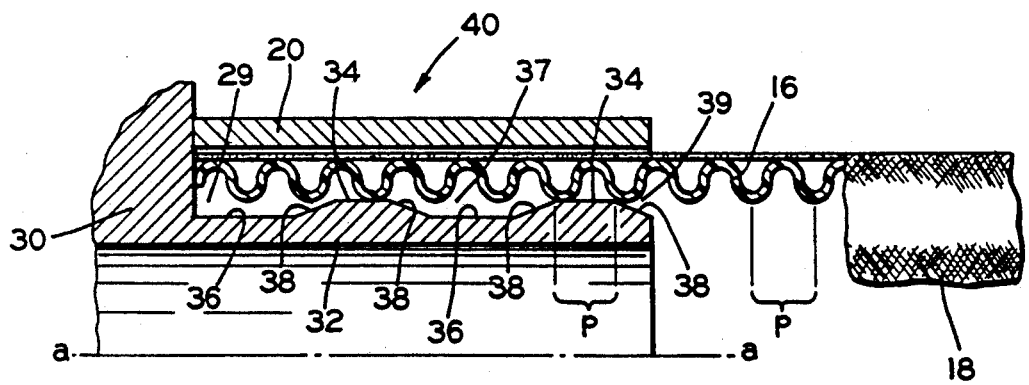
FIG. 3 is a fragmentary view of a preferred embodiment of the present invention which includes a hose end fitting in combination with a convoluted hose end prior to crimping.
Figure 4:
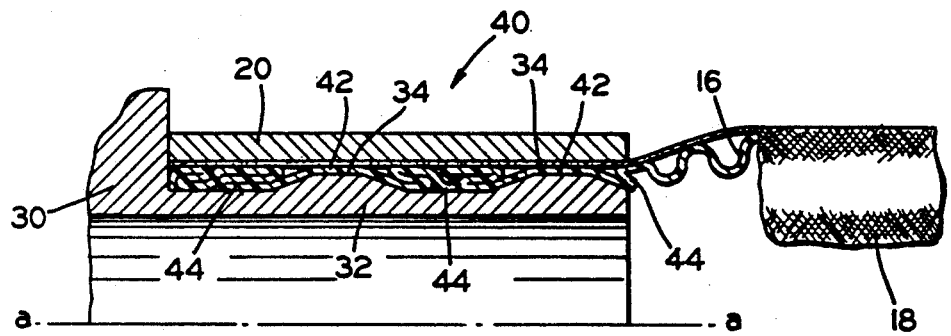
FIG. 4 is a view similar to that of FIG. 3, but shown after the crimping process.

Referring now to FIGS. 3 and 4, a preferred embodiment 40 of the convoluted hose end assembly of the present invention is shown. The assembly 40 provides a preferred embodiment of an end fitting 30, which includes a nipple insert 32 having a contoured exterior surface for the purpose of creating a controlled collapse of the tubing end during crimping thereof to the nipple insert. It will be noted that the insert 32 includes a pair of raised cylindrical sealing surfaces 34 which are spaced apart. A relief region 37 is positioned between the surfaces 34. It will also be appreciated that the pitch width (the length of on cycle of hose convolutions) of the hose 16 for use therewith has a value equal to "p". In the invention as herein described, each sealing surface 34 will have a longitudinal width as measured along axis "a—a" equal to the value "p". This inventor has found that the relationship of the longitudinal width of the sealing surfaces to the pitch width of the hose creates a collapse of the convolutions as shown in FIG. 4, wherein the hose becomes flattened as shown at 42, directly over each sealing surface 34. Intermediately of the sealing surfaces (i.e., at the relief region more particularly described hereinafter), a random collapse or crush portion is developed, as shown at 44. Thus, although the convolutions flatten out at the sealing surfaces 34, the convolutions overlying the relief region have a random crush pattern. Thus the invention provides an ideal sealing system at the raised cylindrical sealing surfaces 34, while any additional effective sealing which is achieved within the relief region 37 although desirable is incidental.

In the preferred form, the relief region includes a reduced diameter portion 36 which has a longitudinal length measured along the axis "a—a" equal to or greater than one pitch width "p". The amount of reduction of the diameter has to be determined by trial and error, to the extent that this inventor has found that the preferred reduction is greater for hoses of increasing size. For example, a convoluted hose having a diameter of 2 inches will require more of a reduction in diameter in the relief region than will a hose having a ¼ inch diameter. At the boundaries of each reduced diameter segment 36 are relief ramps which join the reduced diameter portions to the sealing surfaces. In the preferred form, this inventor has determined that the ramps may have an angle within a range of 10–25 degrees as measured with respect to the axis "a—a".

The preferred form of this invention utilizes at least two sealing surfaces 34, each having a single relief region 37 therebetween. The relief region 37 has been defined to have a reduced diameter portion 36 equal to at least one pitch width, or a value of "p". Sealing surfaces positioned at the extremities of the insert each have one relief zone. Relief zones are distinguished from relief regions by the fact that the zones are not bounded on both sides by sealing surfaces, nor do the zones have any special dimensional relationship to the pitch width of the hose. Relief zones also may exist as a single relief ramp 38 as shown by the relief zone 39 at the rightward extremity of the nipple insert 32. Conversely, a relief zone may include a reduced diameter portion 36 as well as a relief ramp 38 as per the relief zone 29 shown at the lefthand extremity of the nipple insert 32. It will be apparent to those skilled in the art that a relief zone will include at least one relief ramp. The intended purpose of relief zone is to provide relief for the convolutions which spread outwardly of the sealing zone during the crimping process. By contrast, a relief region, which lies intermediately of any two sealing surfaces 34, always defines a reduced diameter portion 36 having two opposed relief ramps 38 on either side of the portion 36.

In the preferred form as described herein, the sheath 18 is of a metallic wire braid having a herringbone pattern. A steel braid sheath will provide optimal strength for this purpose.

Finally, in the preferred form, the sealing surfaces, relief regions, and relief zones of the nipple insert 32 are all annular, and each comprises a zero helical angle. This is preferred, even though the convolutions of the hose 16 are helical. This inventor has determined that the use of a "zero helix" or annular sealing surface provides a preferred mechanism for initiating the flattening of the convolutions which occurs during the crimping step over the sealing surfaces 34 as shown at 42. Also in the preferred form, this inventor has determined that there is some flexibility with respect to longitudinal width of the sealing surfaces. Hence a preferred range of 75% to 100% of the pitch width for the width of the sealing surfaces 34, regardless of the hose size, will provide the desired flattening effect to achieve an improved seal. This lattitude may, in fact, be attributable to use of an annular-to-helical relationship between the nipple insert sealing surfaces and hose convolutions, although this is only speculation.

Although only one preferred embodiment has been detailed and described herein, the appended claims are envisioned to cover numerous alternate embodiments which are neither shown nor described herein.

What is claimed is:

1. In combination, a hose and a fitting, said fitting secured to one end of said hose, said hose end comprising helical convolutions having a predetermined pitch width, said fitting comprising a generally cylindrical nipple insert sealingly engaging said hose end, said insert having a longitudinal axis along which are spaced at least two distinct raised, annular, non-helical sealing surfaces and a relief region positioned between said surfaces, said relief region having a reduced diameter portion comprising a diameter less than that of each of said sealing surfaces, wherein each of said spaced sealing surfaces has a longitudinal width of approximately one pitch width of said hose, said combination further comprising at least one of said helical convolutions of said hose end being flattened directly over each of said sealing surfaces, and wherein other of said convolutions define a crush portion overlying said relief region, said reduced diameter portion of said relief region being bounded on each side by one of a pair of relief ramps, each ramp opposed to the other and defining equal but opposite angles in a range of 10 to 25 degrees with respect to said longitudinal axis, and wherein said reduced diameter portion is also equal to one pitch width of said hose.

2. The hose and fitting combination of claim 1 further comprising relief zones positioned at the extremities of said sealing surfaces opposite said relief region.

3. The hose and fitting combination of claim 2 wherein said relief zones each comprises at least one relief ramp.

4. The hose and fitting combination of claim 3 wherein said sealing surfaces, relief regions, and relief zones of said nipple insert are annular, each comprising a zero helical angle.

5. The hose and fitting combination of claim 4 further comprising a crimp collar positioned over both said hose end and said nipple insert.

6. The hose and fitting combination of claim 5 further comprising a metallic braid sheath positioned between said hose end and said collar.

7. The hose and fitting combination of claim 6 wherein said hose comprises a tetrafluoroethylene material.

* * * * *